United States Patent [19]

Horn

[11] Patent Number: 4,811,964

[45] Date of Patent: Mar. 14, 1989

[54] WHEELCHAIR PROPELLED BY ROWING

[76] Inventor: Douglas J. Horn, 12813 Saint Andrew Dr., Kansas City, Mo. 64145

[21] Appl. No.: 100,902

[22] Filed: Sep. 25, 1987

[51] Int. Cl.[4] .......... B62M 1/16

[52] U.S. Cl. .......... 280/250.1; 188/2 F; 280/243; 280/246; 280/255; 297/DIG. 4

[58] Field of Search .......... 280/241, 242 R, 242 WC, 280/243, 244, 246, 252, 253, 255; 297/DIG. 4; 188/2 F, 26

[56] References Cited

U.S. PATENT DOCUMENTS

| | | | |
|---|---|---|---|
| 838,228 | 12/1906 | Williams | 280/242 WC X |
| 1,041,936 | 10/1912 | Worthington | 280/240 |
| 1,308,270 | 7/1919 | Barrellier | 280/240 |
| 2,578,828 | 12/1951 | Nelson | 280/242 WC |
| 2,653,037 | 9/1953 | Lassiter . | |
| 3,301,574 | 1/1967 | Good . | |
| 3,563,568 | 2/1971 | Sasse et al. . | |
| 3,666,292 | 5/1972 | Bartos . | |
| 3,953,054 | 4/1976 | Udden et al. . | |
| 3,994,509 | 11/1976 | Schaeffer . | |
| 4,061,206 | 12/1977 | Wood | 188/26 |
| 4,272,096 | 6/1981 | Efros . | |
| 4,300,784 | 11/1981 | Efros . | |
| 4,305,600 | 12/1981 | Mendez | 280/243 X |
| 4,316,616 | 2/1982 | Boivin . | |
| 4,358,126 | 11/1982 | Mitchell et al. . | |
| 4,421,334 | 12/1983 | Efros . | |
| 4,453,729 | 6/1984 | Lucken . | |
| 4,455,029 | 6/1984 | Taylor . | |
| 4,560,181 | 12/1985 | Herron . | |
| 4,632,414 | 12/1986 | Ellefson . | |

FOREIGN PATENT DOCUMENTS

| | | | |
|---|---|---|---|
| 930676 | 6/1955 | Fed. Rep. of Germany | 280/246 |
| 362343 | 6/1906 | France | 280/243 |
| 558164 | 8/1923 | France | 280/243 |
| 929537 | 12/1947 | France | 280/242 R |
| 2455540 | 1/1981 | France | 280/243 |
| 453544 | 12/1949 | Italy | 280/242 R |

*Primary Examiner*—David M. Mitchell

*Assistant Examiner*—Charles R. Watts

*Attorney, Agent, or Firm*—Litman, McMahon & Brown

[57] ABSTRACT

A wheelchair propelled by rowing action includes a wheelchair frame with a pair of large main rear wheels connected by an axle, a rowing lever pivotally connected to the frame, a steering shaft with a handlebar grip mounted coaxially within the rowing lever and connected by a universal joint to a steering linkage connected to caster brackets mounting small front wheels, a pair of ratcheted sprockets mounted on the axle, a pair of sprocket chain segments connected by cables through pulleys to the rowing lever such that pulling and pushing of the rowing lever alternately causes driving engagement of one of the ratchets with the axles for propulsion and causes the other to slip. The leverage exerted by the rowing lever on the ratcheted sprockets is adjustable.

24 Claims, 3 Drawing Sheets

FIG. 5.
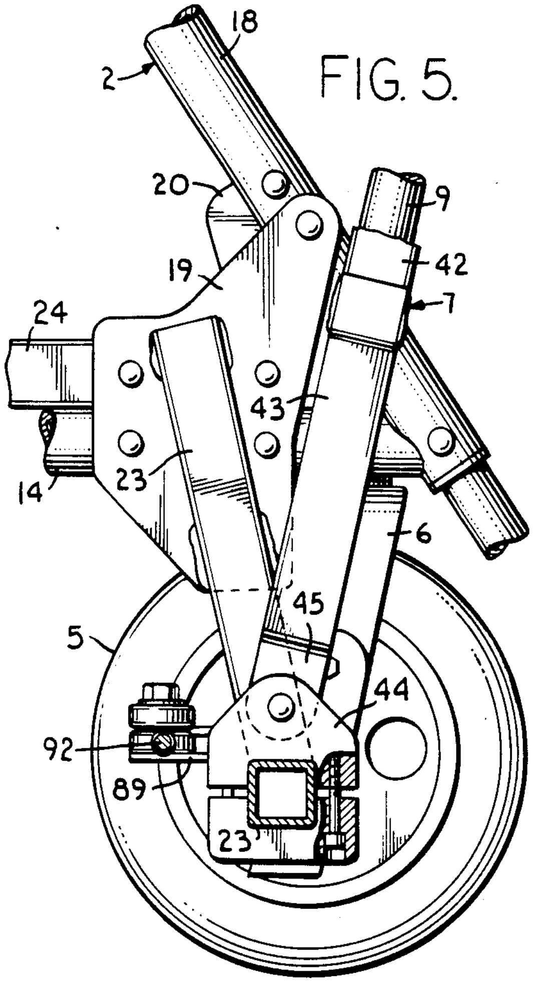
FIG. 6.
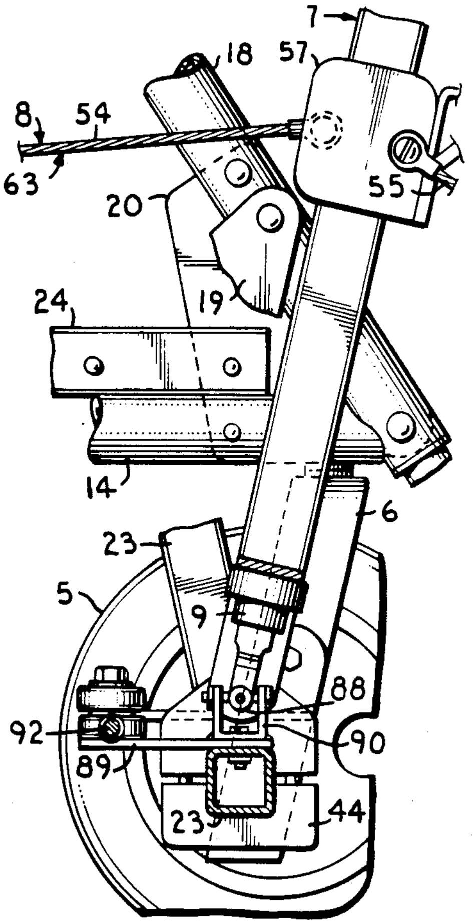
FIG. 7.
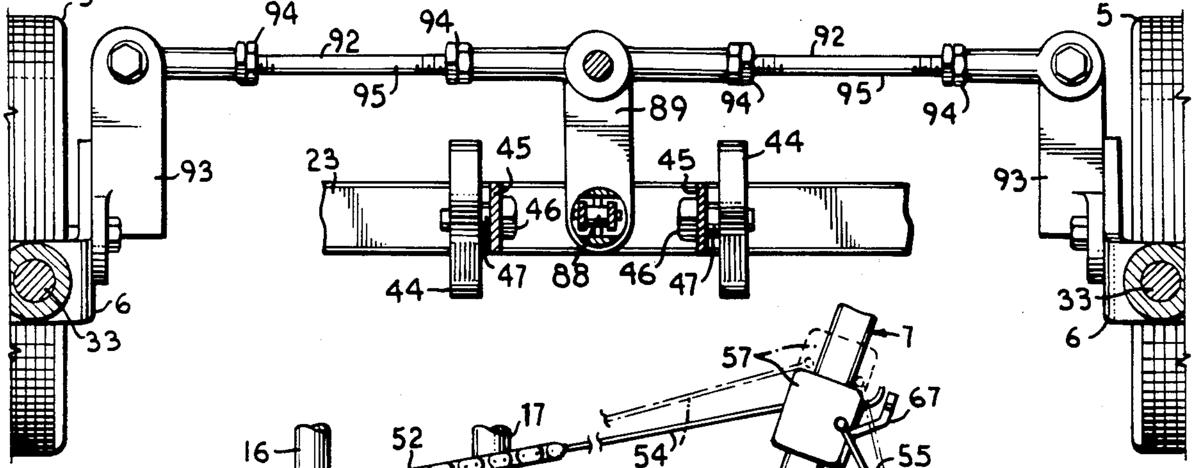
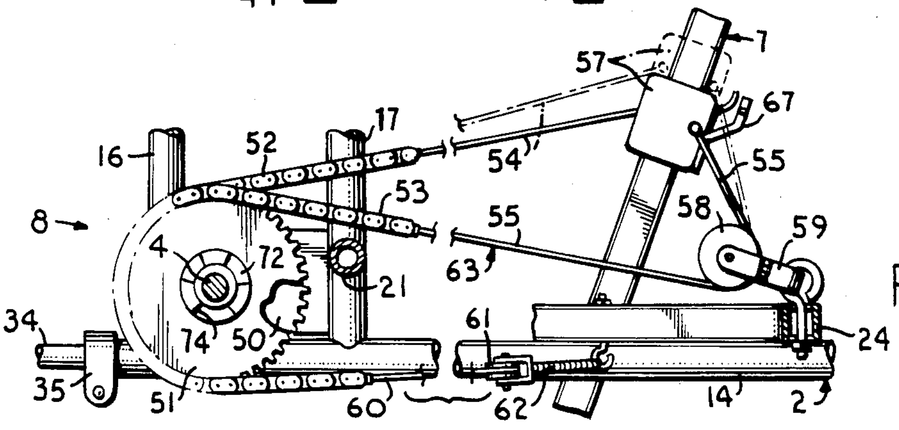
FIG. 8.

WHEELCHAIR PROPELLED BY ROWING

FIELD OF THE INVENTION

The present invention relates to vehicles and, more particularly, to a wheelchair including a single rowing lever which propels the wheelchair by reciprocal movement in both of opposite directions of the rowing lever and which additionally functions as a steering shaft.

BACKGROUND OF THE INVENTION

Many types of human powered vehicles have been developed. Usually, the initial motivation is simply locomotion. Other uses which often evolve for such vehicles include physical exercise and competition, such as racing. Modern types of bicycles are generally considered to be the most efficient types of human powered land vehicles, as far as locomotion is concerned. Light alloy tubular frames, spoked wheels, and adjustable gearing contribute to a decrease in effort required to move a given distance or achieve a given speed compared to other types of human powered locomotion. In bicycle riding, the muscles of the rider's legs supply most of the propulsive effort, with the muscles of the arms and upper body providing mostly steering, support, and balance. Thus, the rider's legs receive the greatest benefits from bicycle riding efforts, along with the rider's cardio-pulmonary systems.

Another relatively efficient form of human locomotion is the rowing of boats on bodies of water. In conventional rowing, the muscles of the arms and, to some extent, the lower back provide the principal propulsive effort with the legs performing principally anchoring and balancing functions. A more efficient form of boat propelled by rowing is the racing shell in which the seat is longitudinally slidable. With the rower's feet anchored, the legs assume the principal propulsive function with the arms and back muscles providing supplementary propulsion. The legs are stronger in extension than the back is in straightening from a bend such that greater force can be applied to the oars or sculls on such vessels than on simpler rowboats. Rowing in either form provides a good workout of the arms and upper body and cardio-pulmonary exercise; and rowing of the racing shell type provides exercise to the leg muscles.

Persons without full functionality of their legs often use wheelchairs as a means of locomotion by the use of their own arms and hands, by being pushed by another, or by the operation of electric motors. Conventional occupant propellable wheelchairs generally include a wheelchair frame, large main wheels turning on an axis extending beneath the seat of the wheelchair, and small castering front wheels. The main wheels are often provided with grasping rings or push rims, approximately the same diameter as the main wheels, which are grasped by the occupant and pushed forward or pulled backward for propulsion or held for braking. Moderate self propulsion of wheelchairs by their occupants provides them with arm and upper body exercise. Sporting events involving wheelchair occupants, including wheelchair races, are often conducted to improve their morale and to induce beneficial physical exercise.

Conventional type wheelchairs, while appropriate for normal locomotion, are less than optimal for racing purposes. The need to grasp the rotating push rims in order to accelerate a moving wheelchair limits the speed of locomotion and can result in abrasions and other hand injuries. Additionally, the need to brake one wheel to steer the wheelchair results in a small decrease in speed during turns or requires than one main wheel be pushed faster than the other.

Efforts have been made to combine the propulsion mechanisms of bicycles and the physical motions of rowing to propel land vehicles. On one such vehicle, a single rear wheel has a bicycle type ratchet hub and a pair of steerable front wheels. The occupant is supported on a sliding seat similar to that on a racing shell. The front wheels are steered by differential foot movements through a linkage connected to foot platforms. A single rowing lever is engaged with the rear wheel hub through a cable and sprocket arrangement such that pulling strokes, assisted by leg extension, is converted to propulsion strokes. Such a device could, presumably, offer beneficial exercise and locomotion to a person having adequate arm and leg facility. However, a majority of persons who use wheelchairs do so because of leg dysfunction. Such persons could use a vehicle such as this only with great limitations.

There have been efforts to apply such bicycle and rowing mechanisms to wheelchairs such that the efficiencies associated with bicycle propulsion could be realized to some extent in wheelchairs by the use of the occupant's arms. The simplest forms of mechanically assisted wheelchair propulsion mechanisms include hand and arm operated reciprocating levers mounted on the wheelchair armrests which frictionally engage the tires of the main wheels. Others have included bicycle type ratchet mechanisms operated by hand levers. At least one device includes a double hand crank connected by a spocket chain to a bicycle type wheel mounted on a frame which connects to the front of a conventional wheelchair.

Most such devices involve some type of inefficiency. Many require separate right and left hand levers. Some make no provision for steering. Most involve single stroke levers such that a propulsion stroke is achieved only in one direction, such as in the pull direction, while the push stroke causes slipping of the ratchet mechanism.

SUMMARY OF THE INVENTION

The present invention provides a wheelchair propelled by rowing motion which surpasses prior mechanically assisted, occupant propelled wheelchairs in many respects. The wheelchair according to the present invention includes a single reciprocating rowing lever in which power strokes are developed in both the pull and push directions. Further, the rowing lever functions as a steering control. Provision is made for adjusting the leverage applied to the driving axle by the rowing lever such that variations in the strength of the users of the wheelchair and variations in the grade of the surface on which the wheelchair is used can be accommodated.

The wheelchair has an almost conventional appearing wheelchair frame including large laterally spaced rear wheels connected by an axle and castering front wheels. A pair of bicycle type ratcheted sprockets are positioned on the axle. Sprocket chain segments engaging the sprockets are connected to the rowing lever by cables and idler pulleys mounted on the frame such that pull and push strokes alternately cause engagement of one ratcheted sprocket with the axle, rotating it, and the wheels while causing the other ratcheted sprocket to slip. A clutch mechanism is provided for disengaging one of the ratchet mechanisms for propulsion during pivoting the rowing lever in one direction only or for disengaging both of the ratchets for facilitated rearward movement of the wheelchair without affecting the position of the rowing lever.

The rowing lever is pivotally connected to the frame and has a steering shaft, with a handle bar at a top end, mounted coaxially therein. The steering shaft is connected by a universal joint to a steering linkage which is connected to caster brackets having the front wheels thereon. The universal joint accommodates both the reciprocal pivoting of the rowing lever and the rotation of the steering shaft. A seat belt is provided for anchoring the occupant during pull strokes if bracing the feet of the occupant against footrests is insufficient to maintain his position; and the seat back resists the occupant's back during push strokes. A bicycle type caliper brake is provided which acts on a disc on the axle for retarding motion of the wheelchair.

The propulsion cables connect to the rowing lever by means of a collar slidable along the rowing lever. A spring pin on the collar fits into detent apertures along the rowing lever. Adjustment of the position of the collar up and down the rowing lever varies the leverage of the rowing lever on the ratcheted sprockets and, thus, functions as a gear shift mechanism. Increasing the leverage decreases the effort required to rotate the axle by converting the same stroke length into less rotation of the axle. Decreasing the leverage has the opposite effect. By this means, the level of the occupant's arm and upper body strength can be accommodated, as well as the grade or slope of the surface upon which the wheelchair will be propelled.

OBJECTS OF THE INVENTION

The principal objects of the present invention are: to provide an efficient occupant propelled vehicle; to provide such a vehicle which is usuable particularly by those with leg dysfunctions; to provide a wheelchair propelled by rowing action; to provide such a wheelchair including a single rowing lever in which propulsion is generated in both pulling and pushing of the rowing lever; to provide such a wheelchair including ratcheted sprockets on an axle connecting the main wheels, sprocket chain segments, and a cable interconnecting the chain segments and connected to the rowing lever through idlers mounted on the frame such that, alternately, one ratcheted sprocket drivingly engages the axle and the other slips in each of the pull and push strokes of the rowing lever; to provide such a wheelchair in which the leverage exerted by the rowing lever on the ratcheted sprockets is adjustable; to provide such a wheelchair wherein a steering shaft with a handle bar at an upper end is mounted coaxially within the rowing lever; to provide such a wheelchair wherein the steering shaft is connected by a universal joint through a steering linkage to front wheel caster brackets to accommodate the pivoting motion of the rowing lever and the rotation of the steering shaft during turning; to provide such a wheelchair including a clutch mechanism to selectively disengage one of the ratchets for propulsion during only one rowing lever stroke direction or both of the ratchets to facilitate reverse motion of the wheelchair; to provide such a wheelchair including footrests to stabilize the occupant's body position during rowing lever pull strokes if the occupant has sufficient leg capability and a seat belt to stabilize the body position of an occupant with diminished leg function; and to provide such a wheelchair propelled by rowing action which is economical to manufacture, efficient and safe in use, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 5 is an enlarged fragmentary longitudinal sectional view taken on line 5—5 of FIG. 4 and illustrates frame and steering linkage details of the front end of the wheelchair.

FIG. 6 is a view similar to FIG. 5 taken on line 6—6 of FIG. 4 and illustrates details of the connection of the steering gear to a rowing lever assembly support of the wheelchair.

FIG. 7 is an enlarged fragmentary plan sectional view taken on line 7—7 of FIG. 2 and illustrates details of the steering linkage of the wheelchair.

FIG. 8 is a fragmentary longitudinal sectional view taken on line 8—8 of FIG. 3 at a reduced scale and illustrates details of the double stroke, single lever rowing mechanism of the wheelchair.

DETAILED DESCRIPTION OF THE INVENTION

Figure 1:
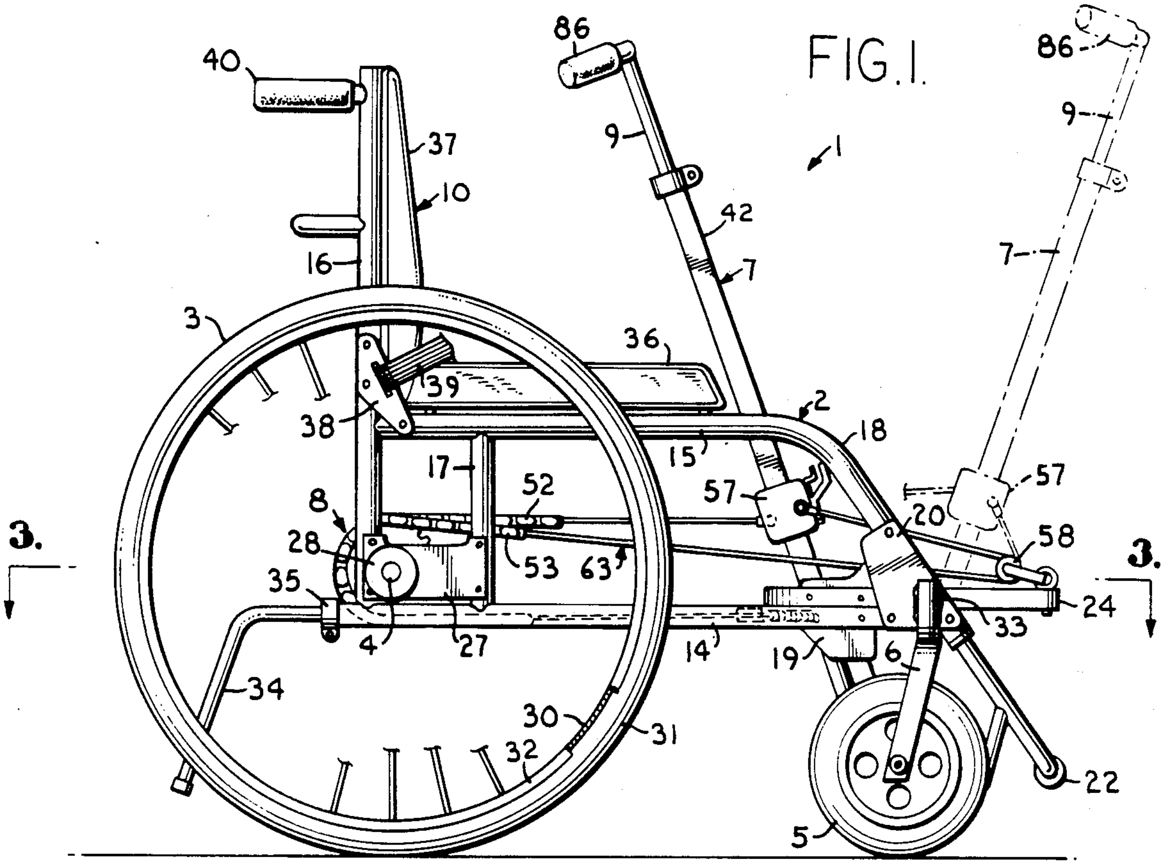
FIG. 1 is a side elevational view of a wheelchair propelled by rowing action according to the present invention with an extended position of a rowing lever shown in phantom.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a wheelchair propelled by rowing action according to the present invention. The wheelchair 1 generally includes a wheelchair frame 2 having a pair of large main wheels 3 rotatably mounted thereon and connected by an axle 4 and a pair of small front wheels 5 mounted on front wheel or caster brackets 6 pivotally connected to the frame 2. A rowing lever assembly 7 is pivotally connected to the frame 2 and is connected by a motion transfer mechanism 8 to the axle 4 whereby reciprocating strokes of the rowing lever assembly 7 is converted to rotary motion in a single direction to propel the wheelchair 1. The rowing lever assembly 7 includes a steering shaft 9 which is axially rotatable with respect to the assembly 7 and which is linked to the caster brackets 6 such that rotation of the steering shaft 9 pivots the front wheels 5 to thereby steer the wheelchair 1. The frame 2 has a seat 10 provided to support an occupant of the wheelchair 1.

The illustrated wheelchair frame 2 includes a pair of lower side rails 14 and upper side rails 15 connected vertically by rear standards 16 and middle standards 17. Front portions 18 of the upper side rails 15 bend to meet the lower side rails 14 where they are joined by inner gusset plates 19 and outer gusset plates 20 (FIGS. 5 and 6). The sides of the frame 2 are connected by appropriate cross members, such as cross member 21 (FIGS. 3 and 8) and others not shown, which are positioned at locations to avoid interference with the motion transfer mechanism 8. At the front, the frame 2 is completed by a foot rest 22, a rowing lever assembly support 23, and a double-U shaped idler support 24, all of which pass from one side of the frame 2 to the other.

Bearing support plates 27 are connected between the rear standards 16 and middle standards 17 on both sides of the frame 2 and have bearings 28 mounted thereto which support the axle 4. The main wheels 3 are attached to the axle 4 in a conventional manner, which may include a "quick disconnect" type of arrangement (not shown) as are found on the wheels of some bicycles. The main wheels 3 are conventional wheelchair wheels, including spoked rims 30, tires 31, and push rims or grasping rings 32. The push rims 32 are provided for hand grasping control of the wheels 3 without the necessity of touching the tires 31.

The front wheels 5 are rotatably mounted on the caster brackets 6 which are pivotally connected to the outer gusset plates 20 by caster pivots 33. It is not essential that the brackets 6 be tilted "caster" brackets; however, it is preferred that the front wheel mounting brackets be tilted forward slightly for more stable function and truer running of the front wheels 5. The front wheels 5 may be substantially conventional wheelchair front wheels. At the rear of the frame 2, back tilt or "wheelie" limiting struts 34 are provided to prevent a backward somersault of the wheelchair 1 if too strong a propulsion stroke is made or too steep a grade is attempted. The illustrated struts 34 are adjustably mounted in releasable clamps 35 in the rear ends of the lower side rails 14.

The illustrated occupant seat 10 includes a bottom cushion 36 attached to the upper side rails 15 and a back cushion 37 attached to the rear standards 16. A seat belt anchor, such as the illustrated seat belt gussets 38, are connected between the upper side rails 15 and the rear standards 16 and provide for the attachment of an occupant seat belt 39. The seat belt 39 is useful for stabilizing the body position of an occupant, particularly during pull strokes of the rowing lever assembly 7, when the occupant does not have sufficient leg strength or control to stabilize his position by pushing his legs against the footrest 22. The wheelchair 1 is preferably provided with push handle means or push handles 40 which may be gripped by a non-occupant to push the wheelchair 1. The handles 40 are attached to the rear standards 16.

Figure 4:
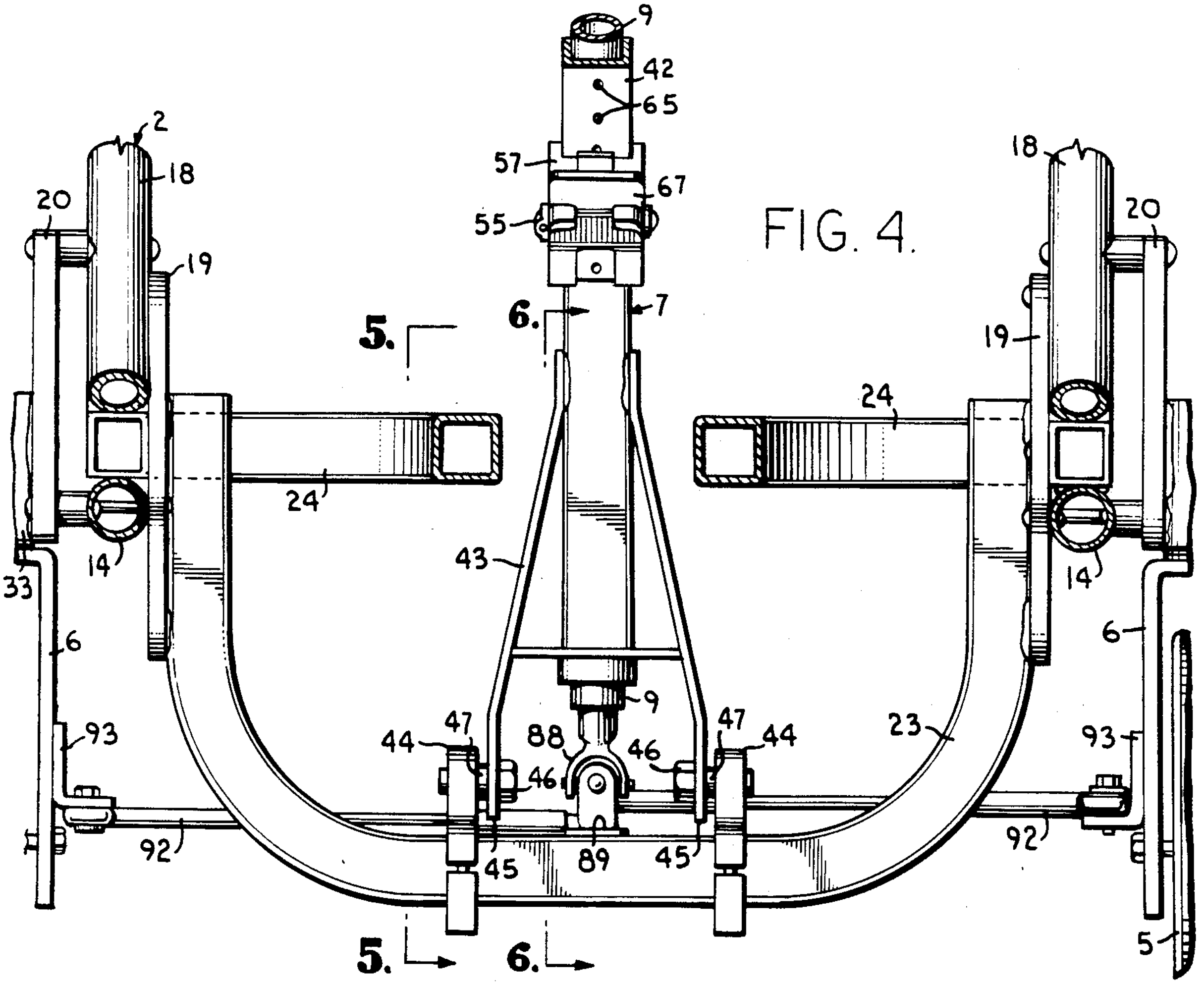
FIG. 4 is an enlarged fragmentary transverse sectional view of the wheelchair taken on line 4—4 of FIG. 3 and illustrating details of rowing and steering assembly.

Referring to FIGS. 4, 5, and 6, the illustrated rowing lever assembly 7 includes a tubular rowing lever 42 which is pivotally connected to the rowing lever assembly support member 23 by means of an A-shaped pivot bracket 43. The support member 23 is a wide U-shaped member and has pivot clamps 44 attached to a lower portion thereof. Lower ears 45 of the A-shaped bracket 43 are pivotally attached to the pivots 44 as by bolts 46 and washers 47. Upper portions of the A-shaped bracket 43 are attached to the rowing lever 42, as by welding.

Figure 3:
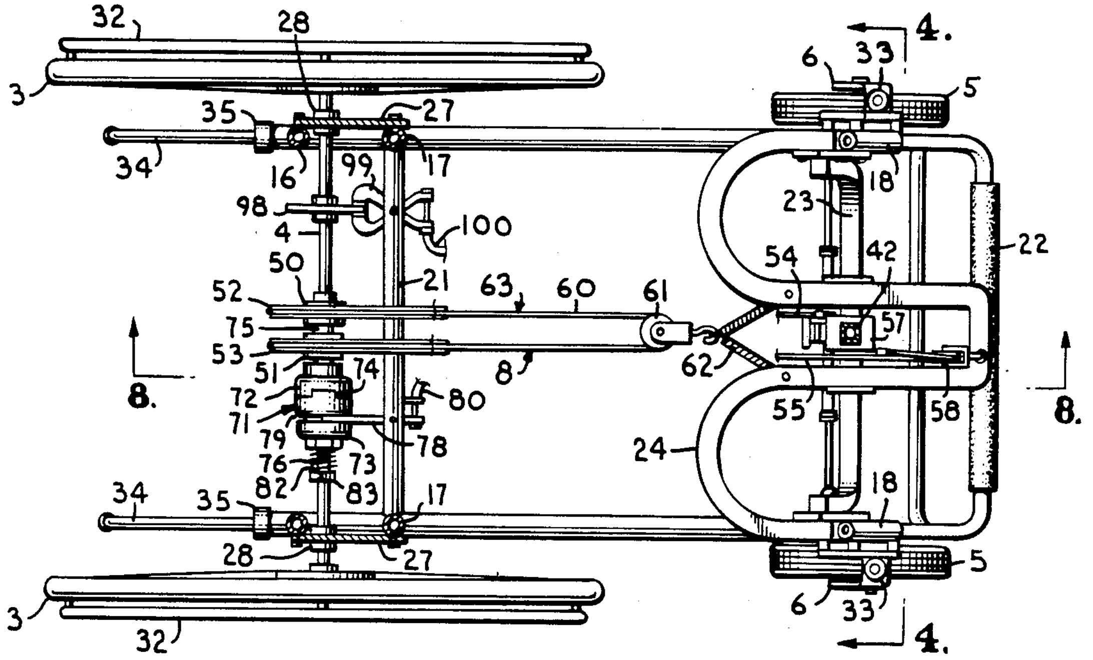
FIG. 3 is a fragmentary plan sectional view of the wheelchair taken along line 3—3 of FIG. 1 and illustrates details of the wheelchair frame and propulsion mechanisms.

Referring to FIGS. 3 and 8, the motion transfer mechanism 8 may be any arrangement which is capable of converting reciprocal pivoting of the rowing lever assembly 7 in opposite directions into rotary motion of the axle 4 in a single or common direction. The illustrated motion transfer mechanism 8 incorporates a pair of ratcheted sprockets 50 and 51. The sprocket ratchet mechanisms are conventional rotary ratchet mechanisms and are similar to the types employed on the rear hubs of bicycles. The ratchet mechanisms (not detailed) are each adapted such that the associated sprocket drivingly engages and rotates with the axle 4 in a forward wheelchair direction (clockwise in FIG. 8) and slips in the opposite direction of rotation of the sprocket with respect to the axle 4 (counterclockwise in FIG. 8).

The sprockets 50 and 51 have respective sprocket chain segments 52 and 53 wrapped therearound and engaged therewith. The upper ends of the chain segments 52 and 53 are connected by respective end cable segments 54 and 55 to a collar 57 slidably mounted on the rowing lever 42 and releasably fixable therealong. One of the end cable segments, for example end cable segment 55, passes about an end idler pulley 58 mounted on an end idler bracket 59 which is pivotally connected to the idler support member 24. The lower ends of the chain segments 52 and 53 are interconnected by an intermediate cable segment 60 which passes about an intermediate idler pulley 61 connected to the idler support 24 by an intermediate idler spring 62. The sprocket chain segments 52 and 53, the end cable segments 54 and 55, and the intermediate cable segment 60 form a cable assembly 63 which transfers the pivoting motion of the rowing lever 42 to the ratcheted sprockets 50 and 51. The operational location of the intermediate idler pulley 61 is angularly around the axle 4 from the end idler pulley 58.

When the rowing lever 42 is pushed forward, the left end cable segment 54 and left sprocket chain 52 are pulled which causes rotation of the left sprocket 50 in the forward wheelchair direction, thus, causing the axle 4 to rotate and the main wheels 3 therewith to propel the wheelchair 1 in the forward direction. The tension in the left chain segment 52 is transferred to the the right chain 53 through the intermediate idler 61 in such a manner as to rotate the right sprocket 51 in a reverse direction whereby it slips relative to the axle 4. Pulling the rowing lever 42 toward the rear has the opposite effect, such that initial tension is created in the right end cable segment 55 and the right sprocket chain segment 53 to turn the right sprocket 51 in the forward direction causing forward rotation of the axle 4 and wheels 3 while the left sprocket 50 slips relative to the axle 4. Thus, the left and right ratcheted sprockets 50 and 51 alternate in driving and slipping relative to the axle 4, depending on the direction of the stroke of the rowing lever 42.

The position of the collar 57 along the rowing lever 42 is adjustable to thereby adjust the leverage exerted by it on the sprockets 50 and 51. The fulcrum for the rowing lever 42 is the axis formed by the bolts 46. Increasing the distance of the collar 57 from the bolts 46 decreases the leverage of the rowing lever 42 on the sprockets 50 and 51 whereby a greater degree of rotation of the axle 4 occurs for a given stroke angle of the lever 42 at the expense of increased resistance to the pivoting of the lever 42. This is analogous to a high gear ratio. Decreasing the distance between the collar 57 and the bolts 46, on the other hand, increases the leverage of the rowing lever 42 on the sprockets 50 and 51 whereby less rotation of the axle 4 occurs for a given stroke angle with the benefit of decreased resistance to the pivoting of the rowing lever 42. This is analogous to a low gear ratio.

Figure 9:
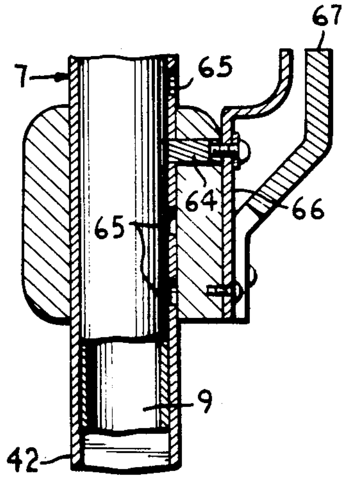
FIG. 9 is a greatly enlarged sectional view illustrating details of a leverage adjustment collar on the rowing lever of the wheelchair according to the present invention.

The collar 57 may be removably fixed in a selected position by the cooperation of a collar lock pin 64 (FIG. 9) and apertures 65 spaced along the rowing lever 42. The pin 64 is attached to a leaf spring 66 which urges the pin 64 toward the rowing lever 42. A collar grip handle 67 is provided on the collar 57 to facilitate sliding the collar 57 along the rowing lever 42. The leverage exerted on the axle 4 by the rowing lever 42 can, thus, be adjusted to suit the arm and upper body strength of the occupant or to suit the road conditions on which the wheelchair 1 is operated. The intermediate idler spring 62 allows some give in the cable assembly 63 when the position of the collar 57 is adjusted to thereby keep the cable segments and sprocket chain segments in tension regardless of the position of the collar 57.

Referring to FIG. 3, a clutch mechanism 71 is provided on the axle 4 and is operable to disengage the ratcheted sprockets 50 and 51 from the axle 4. The clutch 71 includes an axially immovable clutch component 72 and an axially movable clutch component 73 which have interfitting clutch fingers 74. The axially immovable clutch component 72 and the ratcheted sprockets 50 and 51 are affixed to a sleeve 75 which, although axially immovable, is rotatable with respect to the axle 4 except when the clutch components 72 and 73 are engaged. The axially movable clutch component 73 is slidably keyed to the axle 4 by a key member 76 such that it always rotates with the axle 4. When the movable clutch component 73 is separated from the fixed component 72, the sleeve 75 slips relative to the axle 4, regardless of pivoting actions of the rowing lever 42 and without effect on the position of the rowing lever. This allows free coasting of the wheelchair 1 in either the forward or reverse direction. When the clutch components 72 and 73 are engaged, the sleeve 75 rotates with the axle 4, such that propulsion by pivoting of the rowing lever 42 can be accomplished.

Figure 2:
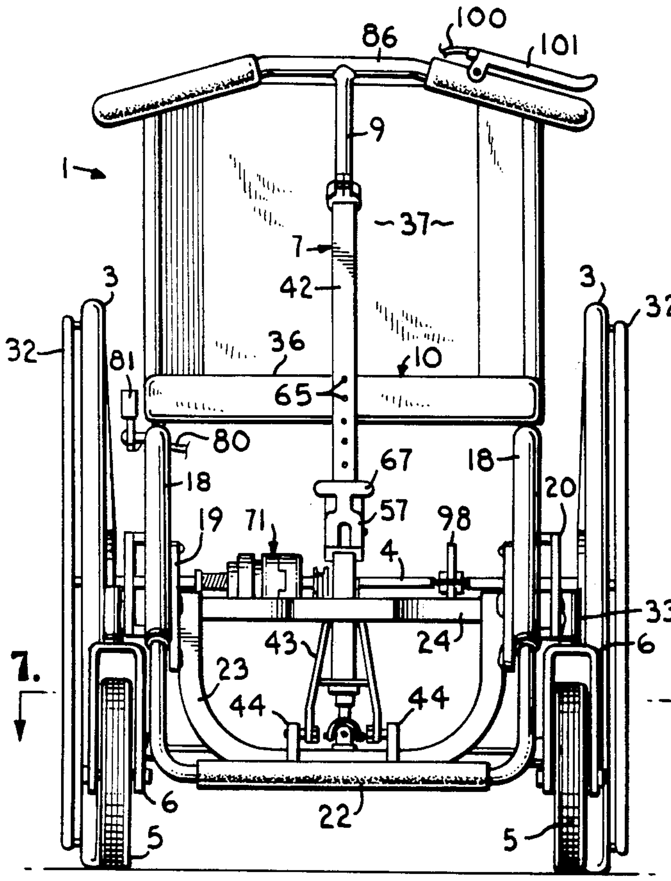
FIG. 2 is a front elevational view of the rowing wheelchair.

The clutch 71 is controlled by means of a sliding yoke 78 pivotally connected to the cross member 21. The yoke 78 rides in a groove 79 formed in the surface of the movable clutch component 73. The yoke 78 is pivoted by the action of a clutch cable 80, similar to a bicycle brake or gear shift cable, which is operated by a clutch control lever 81 (FIG. 2) positioned on the frame 2 at a location accessible by the occupant. A clutch return spring 82 abutting a spring stop collar 83 urges the movable clutch 73 into engagement with the immovable clutch component 72. The clutch control lever 81 may incorporate a detent or other mechanism (not shown) for removably locking the clutch 71 in the disengaged position.

The illustrated clutch mechanism 71 disengages both ratcheted sprockets 50 and 51 simultaneously. The wheelchair 1 could alternatively be provided with individual clutch mechanisms (not shown) similar to the clutch mechanism 71 for each of the sprockets 50 and 51. With such an individual clutch arrangement, each of the sprockets 50 and 51 would be positioned on a separate axially fixed sleeve which would be rotatable relative to the axle 4 when the corresponding clutch were disengaged. Separate control levers and control cables would also be required. Such an individual clutch arrangement would be useful if it were desirable to disengage a selected one of the ratcheted sprockets to allow propulsion in only one direction of pivoting of the rowing lever 42. Detents or releasable locks would be desirable on the clutch control levers in such an arrangement.

Referring particularly to FIGS. 4, 6, and 7, the steering shaft 9 is mounted coaxially within the rowing lever 42. The steering shaft 9 includes a handle bar 86 at a top end for grasping by the occupant to rotate the steering shaft 9 and for pivoting the rowing lever 42. The length of the rowing lever assembly 7 can be made adjustable by the use of a sliding key and clamp arrangement (not shown) between telescoping portions (not shown) of the steering shaft 9 such that the height of the handle bar 86 could be adjusted to the height and arm length of the occupant. At a lower end of the steering shaft 9, a universal joint 88 connects the steering shaft 9 to a steering level 89 which is pivotally connected to the rowing lever assembly support 23 by means of a U-shaped bracket 90. The steering lever 89 is connected by steering arms or links 92 to L-shaped steering brackets 93 attached to the caster brackets 6 having the front wheels 5 mounted thereon. The illustrated steering link means or arms 92 are adjustable in length by means of nuts 94 and threaded rods 95 to thereby adjust the alignment of the front wheels 5. The universal joint 88 accommodates both the rotation of the steering shaft 9 and the pivoting of the rowing lever 42 such that both functions can be incorporated into a single rowing lever assembly 7. When the steering shaft 9 is rotated, the motion is transferred to the caster brackets 6 to thereby steer the front wheels 5 in unison.

The wheelchair 1 is preferably provided with at least one brake to retard the motion thereof and as a park brake to hold the position of the wheelchair 1. As illustrated in FIG. 3, a brake disc 98 is keyed to the axle 4 and has a brake caliper 99 cooperating therewith. The caliper 99 is mounted on the cross member 21 and has a brake cable 100 connected thereto. The brake cable 100 has its opposite end connected to a bicycle type brake lever 101 (FIG. 2) positioned on the handlebar 86 for manual operation. For use as a park brake, the brake lever 101 would be provided with a detent or releasable lock mechanism (not shown). Dual caliper and disc brake systems can also be provided for operation by both hands. Alternatively, other types of brake systems are contemplated, such as band brake systems (not shown).

For use of the wheelchair 1, the occupant is assisted onto the wheelchair seat 10 with his feet resting on the foot rest 22. Extension of the rowing lever assembly 7 facilitates the occupant's mounting of the wheelchair 1. Preferably, the seat belt 39 is fastened about the occupant's hips to secure his body position on the wheelchair 1. The clutch mechanism 71 is then engaged, if previously disengaged, and the brake caliper 99 is released, if engaged. For propulsion, the handle bar 86 of the rowing lever assembly 7 is grasped and pivoted toward the occupant and away to cause rotation of the axle 4 and the main wheels 3. During the pivoting of the rowing lever assembly 7, its pivoting motion is transferred to the ratcheted sprockets 50 and 51 through the cable assembly 63 such that the ratcheted sprockets 50 and 51 alternately engage with the axle 4 and slip relative thereto.

Steering of the wheelchair 1 is accomplished by turning the handle bar 86 which rotates the steering lever 89 through the steering shaft 9 coaxial with the rowing lever 42. The steering lever 89 pivots the caster brackets 6 through the steering arms 92 and L-brackets 93 to thereby pivot the front wheels 5 in unison. Movement of the wheelchair 1 can be retarded by operation of the brake lever 101 which causes the brake caliper 99 to frictionally grip the brake disc 98 keyed to the axle. The clutch mechanism 71 can be disengaged by operation of the clutch lever 81 such that the wheelchair 1 can be moved in a reverse direction with affecting the position of the rowing lever assembly 7. If it is desired to change the leverage exerted on the ratcheted sprockets 50 and 51 by the rowing lever 42, the collar 57 may be adjusted up or down the rowing lever 42 and locked into place by operation of the lock pin 64.

While the wheelchair 1 has been described and illustrated as having a pair of front wheels 5, a wheelchair according to the present invention incorporating a single front wheel is also contemplated.

It is to be understood that while certain forms of the present invention have been illustrated and described herein, it is not to be limited to the specific forms or arrangement of parts described and shown.

What is claimed and desired to be secured by Letters Patent is as follows:

1. A wheelchair propelled by rowing action comprising:

(a) a wheelchair frame with a wheelchair seat;

(b) a pair of laterally spaced main rear wheels affixed to an axle, said axle being rotatably mounted on said frame;

(c) at least one steerable front wheel rotatably mounted on a front wheel bracket pivotally connected to said frame;

(d) elongated rowing lever means pivotally connected to said frame such that said rowing lever means is capable of reciprocal pivoting movement about a lateral axis of said frame, said lever means including a handle;

(e) motion transfer means drivingly engaged between said lever means and said axle such that pivoting motion of said lever means in opposite directions is converted to rotary motion in a single direction which is transferred to said axle to thereby propel said vehicle in a forward direction of said wheelchair;

(f) disengageable clutch means coupled between said motion transfer means and said axle and operable when disengaged to cause the slippage of said motion transfer means about said axle in both clockwise and counterclockwise directions;

(g) said handle being pivotably to thereby pivot said rowing lever means about a longitudinal axis of said rowing lever means;

(h) steering link means operatively connected between said rowing lever means and said front wheel bracket such that pivoting said lever means about said longitudinal axis thereof causing pivoting of said front wheel bracket whereby said vehicle is steered; and (i) said rear wheels being sized and said axle being positioned on said frame directly adjacent to and on opposite sides of said seat to allow propulsion of said wheelchair by an occupant thereof upon disengagement of said clutch means by said occupant manually rotating said rear wheels.

2. A wheelchair as set forth in claim 1 wherein said rowing lever means includes:

(a) an elongated rowing lever having a bottom end pivotally connected to said frame to pivot about a lateral axis of said frame; and (b) a steering shaft mounted coaxial with said rowing lever, having a hand grip at a top end of said steering shaft, and having a lower end linked to said front wheel bracket to pivot said steering bracket upon the rotation of said steering shaft to thereby selectively steer said vehicle.

3. A wheelchair as set forth in claim 2 wherein:

(a) said rowing lever is tubular; and (b) said steering shaft is mounted coaxially within said rowing lever 4. A wheelchair as set forth in claim 3 including:

(a) a steering lever connected to said steering shaft; and (b) a steering arm pivotally connected between said steering lever and said front wheel bracket such that rotation of said steering shaft rotates said front wheel bracket through said steering arm.

5. A wheelchair as set forth in claim 4 including:

(a) a universal joint connecting said steering shaft to said steering lever to accomodate both the reciprocal pivoting of said rowing lever and the rotation of said steering shaft.

6. A wheelchair as set forth in claim 2 wherein:

(a) said wheelchair includes a pair of front wheels rotatably mounted on respective front wheel brackets pivotally connected to said frame at laterally spaced positions;

(b) a steering lever is connected to said steering shaft; and (c) a steering arm is pivotally connected between said steering lever and each front wheel bracket such that rotation of said steering shaft rotates said front wheel brackets through the steering arms.

7. A wheelchair as set forth in claim 1 wherein said motion transfer means includes:

(a) first and second ratchet means mounted on said axle, each ratchet means rotating with said axle in a forward direction of rotation of said ratchet means to cause forward vehicle motion and slipping relative to said axle in an opposite rear direction of rotation of said ratchet means;

(b) idler means connected to said frame;

(c) cable means having opposite ends connected to said rowing lever means and having intermediate portions engaging said idler means; and (d) said cable means having intermediate portions drivingly engaging both of said ratchet means such that pivoting said rowing lever means in a first direction causes the rotation of said first ratchet means in said forward direction and rotation of said second ratchet means in said rear direction and pivoting said rowing lever means in an opposite second direction causes the rotation of said second ratchet means in said forward direction and the rotation of said first ratchet means in said rear direction such that said vehicle is propelled in said forward vehicle direction in each direction of reciprocal pivoting of said rowing lever means.

8. A wheelchair as set forth in claim 7 including:
(a) a rowing lever collar positioned on said rowing lever means;
(b) said opposite ends of said cable means are connected to said collar; and
(c) said collar is releasably fixable at various positions along said rowing lever means such that the leverage exerted by said rowing lever means on said ratchet means is selectively variable.

9. A wheelchair as set forth in claim 8 wherein:
(a) at least one of said end idler and said intermediate idler is resiliently connected to said frame.

10. A wheelchair as set forth in claim 8 including:
(a) a plurality of collar lock apertures spaced along said rowing lever means;
(b) a collar lock pin slidably positioned in said collar to enter one of said apertures;
(c) a spring connected between said collar and said pin and urging said pin toward said rowing lever means; and
(d) a collar grip handle affixed to said collar for grasping to move said collar and positioned for grasping said handle while simultaneously urging said pin away from said rowing lever means by one hand to thereby release said collar for sliding along said rowing lever means.

11. A wheelchair as set forth in claim 1 wherein:
(a) said wheelchair frame includes a pair of rear standards in laterally spaced relation; and
(b) push handle means is connected to said rear standards such that when said clutch means is disengaged, said wheelchair may be pushed by a nonoccupant of said wheelchair by gripping said handle means.

12. A wheelchair propelled by rowing action comprising:
(a) a wheelchair frame with a wheelchair seat;
(b) a pair of laterally spaced main rear wheels affixed to an axle, said axle being rotatably mounted on said frame;
(c) at least one steerable front wheel rotatably mounted on a front wheel bracket pivotally connected to said frame;
(d) ratchet means mounted on said axle, said ratchet means rotating with said axle in a forward direction of rotation of said ratchet means and slipping relative to said axle in an opposite rear direction of rotation of said ratchet means;
(e) disengageable clutch means coupled between said ratchet means and said axle and operable when disengaged to cause the slippage and operable when disengaged to cause the slippage of said ratchet means in both said forward and rear directions of rotation of said ratchet means relative to said axle;
(f) an elongated rowing lever having a bottom end pivotally connected to said frame to pivot about a lateral axis of said frame;
(g) cable means having a portion resiliently engaged with said frame, having an end connected to said rowing lever, and drivingly engaging said ratchet means such that reciprocal pivoting of said rowing lever rotates said ratchet means alternately in said forward direction thereby rotating said wheels and propelling said wheelchair and rotates said ratchet means in said rear direction thereby causing slippage of said ratchet means;
(h) a steering shaft mounted coaxial with said rowing lever, having a hand grip at a top end of said steering shaft, and having a lower end linked to said front wheel bracket to pivot said front wheel bracket upon the rotation of said steering shaft to thereby selectively steer said wheelchair; and
(i) said rear wheels being sized and said axle being positioned on said frame directly adjacent to and on opposite sides of said seat to allow propulsion of said wheelchair by an occupant thereof upon disengagement of said clutch means by said occupant manually rotating said rear wheels.

13. A wheelchair as set forth in claim 12 including:
(a) first and second ratchet means mounted on said axle, each ratchet means rotating with said axle in a forward direction of rotation of said ratchet means to cause forward wheelchair motion and slipping relative to said axle in an opposite rear direction of rotation of said ratchet means;
(b) an end idler connected to said frame such that said rowing lever is positioned between said end idler and said ratchet means;
(c) an intermediate idler connected to said frame at a position angularly around said axle from said end idler; and
(d) said cable means having opposite ends connected to said rowing lever and passing from a first end of said cable means about said first ratchet means drivingly engaging said first ratchet means, about said intermediate idler, about said second ratchet means drivingly engaging said second ratchet means, about said end idler, and back to a second end of said cable means such that: pivoting said rowing lever in a first direction causes the rotation of said first ratchet means in said forward direction and rotation of said second ratchet means in said rear direction, and pivoting said rowing lever in an opposite second direction causes the rotation of said second ratchet means in said forward direction and the rotation of said first ratchet means in said rear direction such that said wheelchair is propelled in said forward wheelchair direction in each direction of reciprocal pivoting of said rowing lever.

14. A wheelchair as set forth in claim 13 wherein:
(a) each ratchet means includes a respective sprocket engaged with said axle by a corresponding ratchet mechanism;
(b) said cable means includes a pair of sprocket chain segments drivingly engaging a respective sprocket;
(c) said sprocket chain segments are connected by an intermediate cable segment engaging said intermediate idler; and
(d) said sprocket chain segments are connected to said rowing lever by end cable segments, one of said end cable segments engaging said end idler.

15. A wheelchair as set forth in claim 13 including:
(a) a rowing lever collar positioned on said rowing lever;
(b) said opposite ends of said cable means are connected to said collar; and (c) said collar is releasably fixable at various positions along said rowing lever such that the leverage exerted by said rowing lever on said ratchet means is selectively variable.

16. A wheelchair as set forth in claim 15 wherein:

(a) at least one of said end idler and said intermediate idler is resiliently connected to said frame.

17. A wheelchair as set forth in claim 12 including:

(a) a steering lever connected to said steering shaft; and (b) a steering arm pivotally connected between said steering lever and said front wheel bracket such that rotation of said steering shaft rotates said front wheel bracket through said steering arm.

18. A wheelchair as set forth in claim 17 including:

(a) a universal joint connecting said steering shaft to said steering lever to accomodate both the reciprocal pivoting of said rowing lever and the rotation of said steering shaft.

19. A wheelchair as set forth in claim 12 wherein:

(a) said wheelchair includes a pair of front wheels rotatably mounted on respective front wheel brackets pivotally connected to said frame at laterally spaced positions;

(b) a steering lever is connected to said steering shaft; and (c) a steering arm is pivotally connected between said steering lever and each front wheel bracket such that rotation of said steering shaft rotates said front wheel brackets through the steering arms.

20. A vehicle as set forth in claim 12 wherein:

(a) said rowing lever is tubular; and (b) said steering shaft is mounted coaxially within said rowing lever.

21. A vehicle as set forth in claim 12 including:

(a) a rowing lever collar positioned on said rowing lever;

(b) said cable means being connected to said collar; and (c) said collar is releasably fixable at various positions along said rowing lever such that the leverage exerted by said rowing lever on said ratchet means is selectively variable.

22. A wheelchair as set forth in claim 21 including:

(a) a plurality of collar lock apertures spaced along said rowing lever;

(b) a collar lock pin slidably positioned in said collar to enter one of said apertures;

(c) a spring connected between said collar and said pin and urging said pin toward said rowing lever; and (d) a collar grip handle affixed to said collar for grasping to move said collar and positioned for grasping said handle while simultaneously urging said pin away from said rowing lever by one hand to thereby release said collar for sliding along said rowing lever.

23. A wheelchair as set forth in claim 12 wherein:

(a) said wheelchair frame includes a pair of rear standards in laterally spaced relation; and (b) push handle means is connected to said rear standards such that when said clutch means is disengaged, said wheelchair may be pushed by a non-occupant of said wheelchair by gripping said handle means.

24. A wheelchair propelled by rowing action comprising:

(a) a wheelchair frame with a wheelchair seat, said frame including a pair of rear standards positioned in laterally spaced relation;

(b) a pair of laterally spaced main rear wheels affixed to an axle, said axle being rotatably mounted on said frame;

(c) at least one steerable front wheel rotatably mounted on a front wheel bracket pivotally connected to said frame;

(d) first and second sprockets engaged by respective ratchet means with said axle, each of said ratchet means rotating with said axle in a forward direction of rotation of said ratchet means and slipping relative to said axle in an opposite rear direction of rotation of said ratchet means;

(e) disengageable clutch means coupled between each of said ratchet means and said axle and operable when disengaged to cause the slippage of said ratchet means in both said forward and rear directions of rotation of said ratchet means relative to said axle;

(f) an elongated and tubular rowing lever having a bottom end pivotally connected to said frame to pivot about a lateral axis of said frame;

(g) first and second sprocket chain segments engaged respectively with said first and second sprockets;

(h) a rowing lever collar releaseably fixable along said rowing lever;

(i) an end idler connected to a front end of said wheelchair frame;

(j) an intermediate idler resiliently connected to said wheelchair frame and spaced from said axle;

(k) cable means including an intermediate cable segment and a pair of end cable segments, said intermediate cable segment interconnecting said sprocket chain segments and passing about said intermediate idler, said end cable segments connecting respectively between said sprocket chain segments and said collar, one of said end cable segments passing about said end idler;

(l) a steering shaft mounted coaxial within said rowing lever, having a hand grip at a top end of said steering shaft, and having a lower end linked to said front wheel bracket to pivot said front wheel bracket upon the rotation of said steering shaft to thereby selectively steer said wheelchair;

(m) said rear wheels being sized and said axle being positioned on said frame directly adjacent to and on opposite sides of said seat to allow propulsion of said wheelchair by an occupant thereof upon disengagement of said clutch means by said occupant manually rotating said rear wheels; and (n) push handle means connected to said rear standards such that when said clutch means is disengaged, said wheelchair may be pushed by a non-occupant of said wheelchair by gripping said handle means.

* * * * *